United States Patent [19]

Smith et al.

[11] 4,048,853

[45] Sept. 20, 1977

[54] METHOD AND APPARATUS FOR MONITORING THE FLOW OF LIQUID AND THE LIKE

[75] Inventors: Peter David Smith; Keith Hindle Smith, both of Blackburn, England

[73] Assignee: Detectronic Limited, Blackburn, England

[21] Appl. No.: 639,015

[22] Filed: Dec. 9, 1975

[30] Foreign Application Priority Data

Dec. 11, 1974 United Kingdom ............... 53598/74

[51] Int. Cl.² .............................................. G01F 1/66
[52] U.S. Cl. ................................................. 73/194 A
[58] Field of Search .................. 73/194 A; 128/205 F

[56] References Cited

U.S. PATENT DOCUMENTS

| | | | |
|---|---|---|---|
| 3,443,433 | 5/1969 | Liston et al. | 73/194 A |
| 3,741,014 | 6/1973 | Tamura | 73/194 A |
| 3,766,517 | 10/1973 | Fahrbach | 73/194 A |

Primary Examiner—Charles A. Ruehl
Attorney, Agent, or Firm—Sughrue, Rothwell, Mion, Zinn and Macpeak

[57] ABSTRACT

A method of measuring the speed of flow of a liquid along a conduit by omitting a continuous acoustic signal of known frequency through a wall of the conduit and receiving the signal reflected, from the liquid. This reflected signal is of increased frequency due to the Doppler effect, and the received signal is demodulated to give a signal at the Doppler difference frequency which is a function of the liquid speed. The Doppler difference frequency is divided by a divisor of known numerical value and the quotient frequency counted. This quotient frequency is a function of the speed of flow or the flow rate, and one or more indicator devices utilize this count either as analogue signal or integrated with respect to time to indicate the instantaneous speed or flow rate or the total volume or weight of liquid which has passed.

11 Claims, 4 Drawing Figures

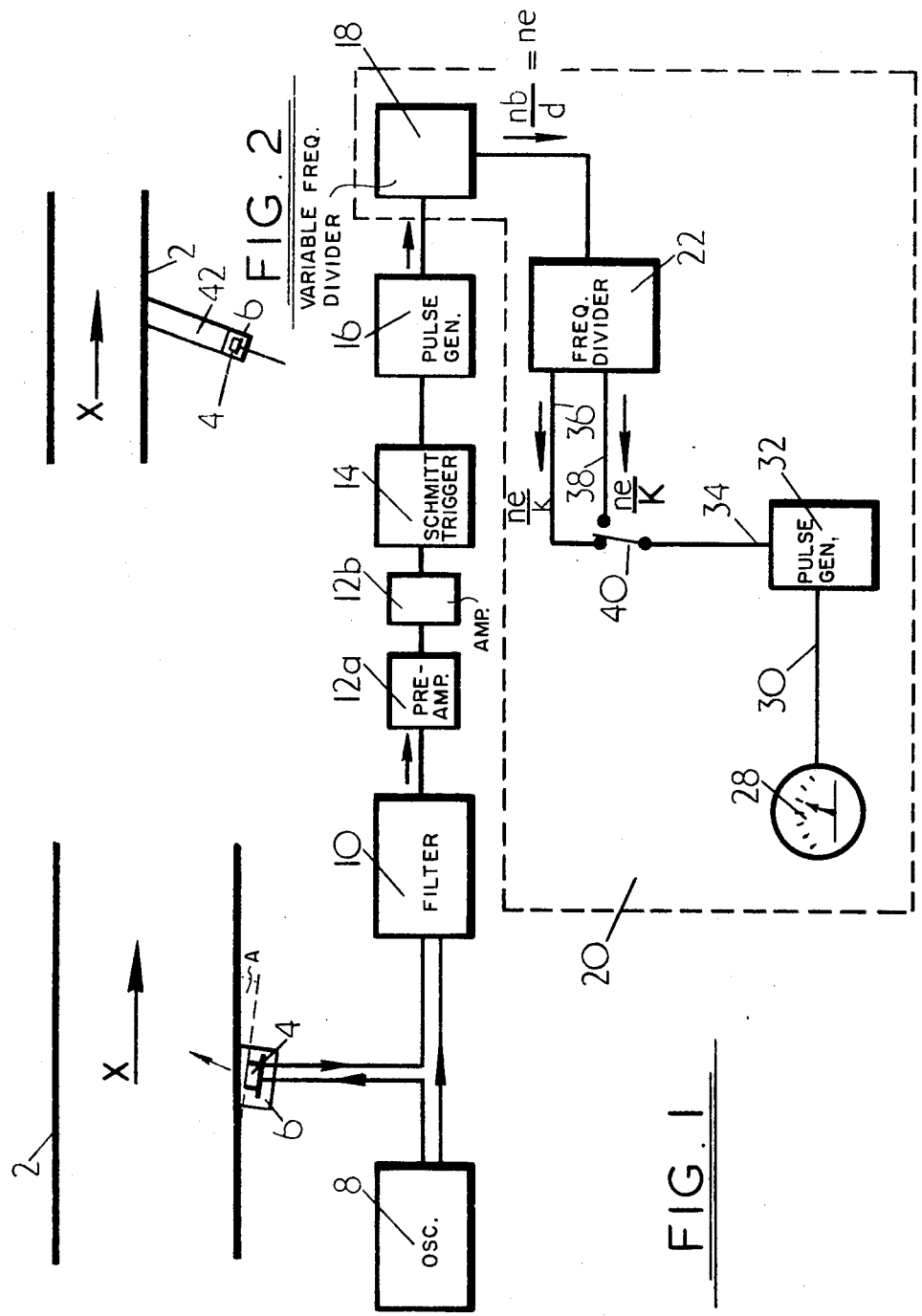

METHOD AND APPARATUS FOR MONITORING THE FLOW OF LIQUID AND THE LIKE

This invention concerns methods and apparatus for monitoring the flow of liquids, slurries, granular material and the like along a conduit.

In British patent specification No. 1,415,839 of Detectronic Limited, a method and apparatus is described for measuring the relative speed of travel of a boat through water using the Doppler effect on an acoustic signal.

We have now discovered that by a modification of method disclosed in aforesaid Specification, it can now be used for measuring the speed of flow of liquid, slurry or granular material (hereafter referred to collectively as liquid) through a conduit, and where the cross-sectional area and density of the liquid is known the speed measurement can be used to compute the volume of liquid passing in unit time and/or the weight of liquid passing in unit time.

According to a first aspect of the invention, a method of monitoring the speed of flow of liquid along a conduit comprises emitting a continuous acoustic signal of known frequency through a wall of a conduit into the liquid flowing therethrough, receiving at least a portion of the reflected signal which due to the Doppler effect has a different frequency than the emitted signal, comparing the frequency of the received signal with that of the emitted frequency and producing an electrical signal of a frequency equal to the difference between the emitted and received frequencies, this frequency difference by virtue of the Doppler effect being proportional to the relative speed of flow of the liquid to the conduit and applying said difference frequency to frequency counter means to provide an indication of the speed.

According to a second aspect of the invention there is provided, apparatus for monitoring the speed of flow of a liquid along a conduit which is provided with emitter and receiver means capable, in response to an applied driving signal, of emitting a continuous acoustic signal of predetermined frequency into the liquid and capable of receiving at least a portion of the reflected signal which due to the Doppler effect has a different frequency to the emitted signal, said apparatus being connectible to said transmitter and receiver means and comprising oscillatory signal generating means for producing the driving signal at said predetermined frequency, filter means for demodulating the emitted frequency from the received frequency to give a first electrical output signal at a frequency equal to the Doppler difference frequency, first frequency divider means for dividing the Doppler difference frequency by a first predetermined divisor to give a first quotient output frequency which is a predetermined function of the Doppler difference frequency per unit increment of liquid speed relative to the emitter and receiver means, second frequency divider means to further divide said first quotient frequency by a second predetermined divisor to give a second quotient output frequency correlated to the speed of the liquid, and means for utilizing said second output quotient frequency to indicate variation of a parameter with respect to time which derives from movement of the liquid along the conduit.

Each aspect of the invention will be further described by way of example with reference to the accompanying drawings, in which:

FIG. 1 is a diagrammatic illustration of a conduit having an acoustic signal emitter and receiver device applied to an outside face of a wall of the conduit, and connected to apparatus according to the second aspect of the invention for carrying out the method according to the first aspect of the invention;

FIG. 2 shows the emitter and receiver device of FIG. 1 applied to an outside surface of a conduit carrying hot liquid;

In the drawings like references refer to like parts.

Figure 3:
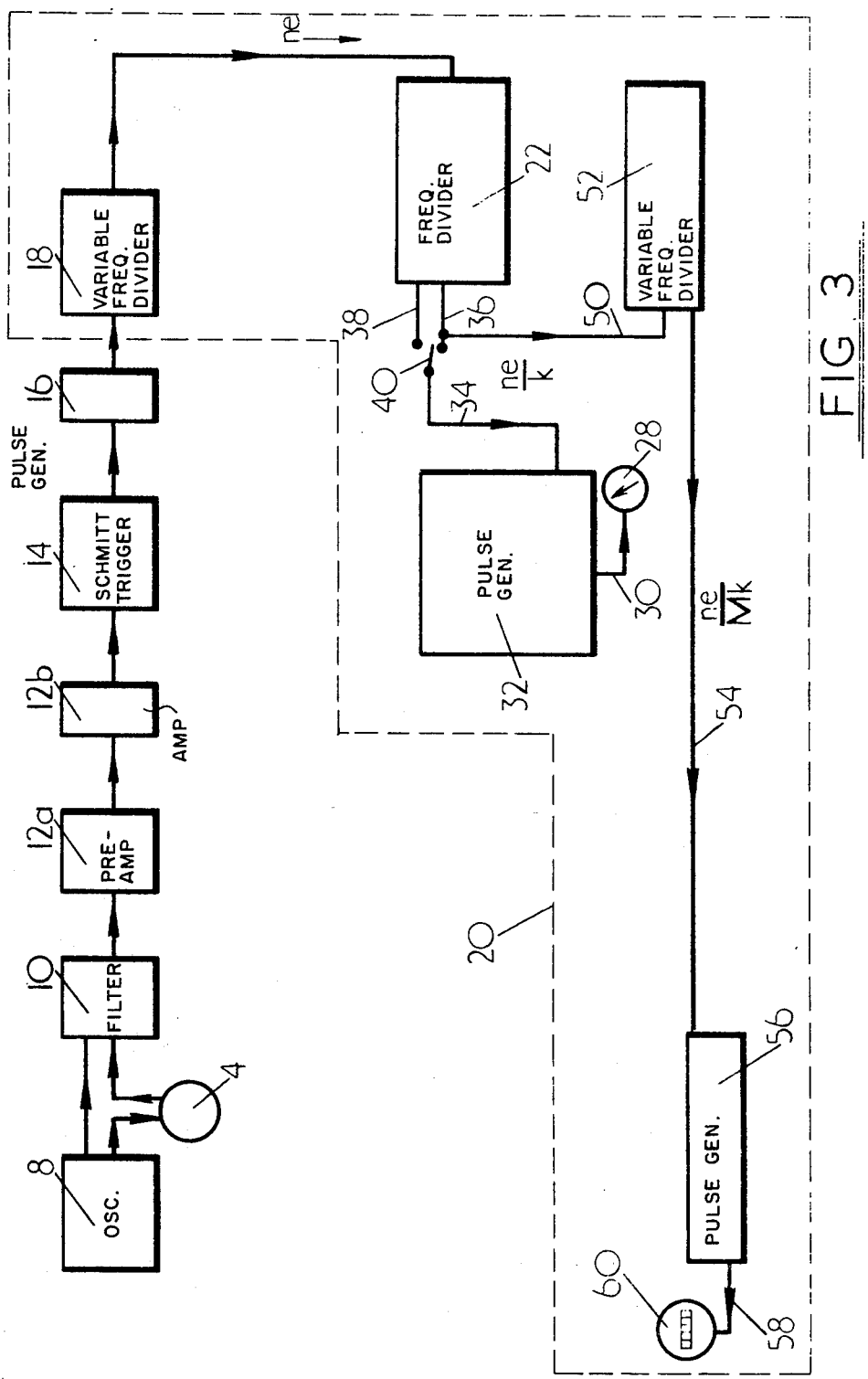
FIG. 3 is a diagrammatic illustration of a preferred modification of the apparatus in FIG. 1.

Referring to FIG. 1, the conduit is shown at 2 through which liquid flows in the direction of arrow X. Mounted on the outside surface of the conduit 2 is an emitter and receiver device 4 of acoustic signals preferably in the ultrasonic range. The device 4 may comprise a piezo-electric crystal or crystals in a ceramic disc and the whole encapsulated as shown at 6 in plastics for example epoxy or polyester resin mounted on the pipe for example by bonding or loose coupled using a wetting agent.

The device 4 is preferably disposed at an angle A to the conduit wall and angle A is preferably about 30°. The signals at the instant of leaving the device 4 have a component of direction parallel to the direction of flow X. If desired the flow can be in the opposite direction to arrow X.

An oscillator 8 generating a continuous electrical signal of predetermined frequency a (preferably in the range of about 0.5M.Hz. to about 5M.Hz., for example, about 1M.Hz) drives the emitter 4 which emits a continuous acoustic signal at the same frequency. This causes the wall of the conduit to resonate at the frequency of the emitter 4 and transmit the acoustic signal to the liquid. The signal is reflected back, at least in part, by, for example particles or boundaries in the liquid and is received by the emitter receiver 4. Because of the Doppler effect due to the flow of the liquid, the received frequency is of an increased frequency C. $C = a + B$, where $B$ is the frequency difference due to the Doppler effect when the liquid is flowing at speed S. The Doppler frequency difference B is proportional to the speed of flow, $B = n\,b$ (where $n$ is any number from 0 to 00) and is the frequency difference produced in liquid flowing at the speed S, where $S = n\,s$, i.e. for each incremental increase $s$ in the speed of flow, the Doppler frequency difference increases by an increment $b$.

When the receiver picks up the reflected acoustic signal, it converts it into an electrical signal of the same frequency C which together with electrical signal of frequency $a$ from the oscillator is fed to filter 10 where the signals are compared and the oscillator frequency demodulated from the received frequency to give an electrical output of the Doppler difference frequency $n\,b$. This signal is amplified by a limiting amplifier, comprised by a pre-amplifier 12a and main amplifier 12b, but the output thereof cannot exceed a maximum predetermined peak to peak voltage, for example 1.8 volts. The amplified output is shaped into square waves by a Schmitt trigger 14 and then pulse generator 16 further shapes the signal to give pulses at constant width, for example 7μ seconds wide, at the difference frequency $n\,b$.

This signal is fed to a variable frequency divider 18 included in a frequency divider chain and frequency counter system 20. The signal is divided in the divider 18 by a divisor of a suitable desired predetermined value $d$ to give an output quotient frequency $n\,e$ where $n\,e = n\,b/d$.

The speed of liquid flow is indicated on a flow speed indicator 28, preferably of ammeter construction linearly responsive to current in line 30 which gives a full scale deflection on the indicator when the latter receives a predetermined mean maximum current $i_{max}$, for example 2m.A from a pulse generator 32. The pulse generator 32 gives an output current provided by output pulses at a frequency equal to the frequency of the signal applied to the pulse generator on line 34. The pulse generator 32 is adjustable to give the mean maximum current $i_{max}$ when the frequency $h$ of the signal in line 34 is $h_{max}$. Depending on the attitude of two-way switch 40 the signal in line 34 comes from either line 36 from an early divide stage in frequency divider 22 or from line 38 from a later divide stage. In the early divide stage the input frequency $n\,e$ is divided by a predetermined divisor $k$ and in the later divide stage by a predetermined divisor $K$ which is greater than $k$. For example, $K$ may equal $5k$. Therefore, there is a full scale deflection of the speed indicator when the output quotient frequency from the divider 22 is $$n\,e/k \text{ or } n\,e/k = h_{max}$$

Accordingly the speed indicator can be used to indicate speeds within a relatively low range when the switch 40 is set for the pulse generator 32 to receive the signal from line 36 or within a relatively high range, which includes the low range, when the switch is changed over for the signals from line 38 to be fed to the pulse generator. For example, if $K = 5k$ the maximum speed indicated in the higher range can be five times greater than the maximum in the lower range.

Because the change in frequency $b$, for each constant incremental change in speed $s$, differs from one liquid to another, according, for example, to elasticity, or differs according to circumstances in the liquid, for example whether the flow is laminar or turbulent, allowance for this must be made for the particular liquid it is intended to monitor under the particular circumstances in the liquid in the conduit. The pulse generator 32 can be re-set to provide the necessary current output means $i_{max}$ for the appropriate value of $h_{max}$ which differs for each different liquid and/or circumstance provided $d$, $k$ and $K$ all remain constants. This re-setting involves changing the duration of each output pulse from the pulse generator 32 which results in producing the mean maximum current $i_{max}$ when the output pulses have a frequency $h_{max}$ of a different value to previous. This can be done by varying the value of a variable resistance (subsequently referred to) in the pulse generator 32. The new liquid to be monitored, at say turbulent flow, is passed along the conduit at a known speed, and then the variable resistance is adjusted until the speed indicator 28 registers this speed. Now the apparatus can indicate the speed of the new liquid at turbulent flow, at any instant, over the whole speed range provided on the speed indicator 28.

In order to adjust the equipment to correct operation during installation of the apparatus, water at a predetermined known speed can be passed down the conduit at turbulent or laminar flow as desired and the signal at the detected Doppler difference frequency $n\,b$ applied to the divider 18. Since the water speed is known to which switch 40 is set to line 36 or 38 according to which speed range on the speed indicator is appropriate so that the input signal to the divider 22 is divided by either $k$ or $K$, both of which have predetermined known constant values, for example 2 or 10. Then the divider 18 is adjusted until the divisor $d$ reaches a value $d_1$ at which the speed indicator registers the correct or substantially the correct speed. The value $d_1$ can be read from an adjustment control provided on the divider 18. Now, if desired, the pulse generator 32 can be adjusted to vary its output current mean $i$ therefrom until the speed indicator 28 registers the speed of the water accurately.

By conducting either laboratory tests, or tests using the apparatus in FIG. 1 in situ, with a frequency meter connected to the output of the filter 10, it is possible to measure the Doppler difference frequency B in water at turbulent flow flowing at a known speed $S_1$ and then calculate the value of $b$ (by dividing B by $S_1$) for each unitary incremental increase $s$ in the speed of flow. The calculated value of $b$ for water at turbulent flow may for example be $b_1$. Another test with the water flowing at laminar flow at known speed $S_2$ would give $b$ a value of $b_2$, and further tests using another liquid L flowing at known speeds at turbulent and laminar flows would give values of $b_3$ and $b_4$ respectively, for $b$. The tests can be carried out using a wide variety of liquids and then a table drawn up showing what percentage of the value $b_1$ is each of the other values $b_2$, $b_3$, $b_4$, etc. In the case of the liquid L at turbulent flow, the table would show that $b_3$ is $100 \times b_3/b_1\%$ or $b_1$. Using this information (and provided the apparatus has been initially set to indicate the speed of water at turbulent flow) the apparatus can be re-set to measure the speed of flow of the liquid L in the conduit 2, merely by adjusting the divider 18 until the divisor $d$ has the value of $$d_1/100 \times 100 \times b_3/b_1$$

The divider 18 can thus be used as a calibrator during both the initial setting up of the apparatus and for re-setting apparatus according to the nature of the liquid the apparatus is to monitor and the type of flow of the liquid.

If desired the line 30 can be connected to a computer device (not shown) which can be programmed to compute the speed of liquid flow in response to current signals received from the pulse generator 32. In this case line 36 or line 38 can be omitted if desired or the computer can be provided with means varied automatically when switch 40 is changed from one position to the other, so that the computer operations are relevant to either the low speed range or the high range as appropriate.

When a computer is used it need not be necessary to adjust the pulse generator 32 or the divider 18 according to which liquid is being monitored or according to a change from laminar to turbulent flow or vice versa in the same liquid. Instead the computer can be programmed or otherwise arranged to allow for the different changes in frequency, due to the Doppler effect, which occurs in different liquids flowing at the same speed or in the same liquid at different flow conditions, so that the computer calculates the correct speed of the liquid being monitored. Also the computer can be programmed with the parameters of cross-sectional area of the conduit and/or the density of the liquid to give an output signal which is a function of the volume of liquid or the weight of liquid flowing in unit time, which output signal can then be used to actuate recorder and/or indicator means giving a visual recording of this computed data. In this case the apparatus also acts as a flow meter.

If the liquid being monitored is hot, it may be convenient to protect the emitter/transmitter assembly 4, 6 from the effect of high temperature by mounting the assembly on a block or rod 42 of a thermal insulating material which has excellent resonating properties, for example glass, mounted on the conduit, as shown in FIG. 2.

In the apparatus in FIG. 3, line 36 leads from a divide by two stage in the divider 22 and line 38 from a divide by ten stage. A line 50 from the line 36 leads to another divider 52 where the signal at frequency $n\,e/k$ from line 36 is divided by a predetermined variable divisor M so that the value of the output quotient frequency on line 54 is $ne/Mk$ which is equal to $nb/dMk$. The signal on line 54 is fed to a pulse generator 56 generating amplified output pulses on line 58 at the same frequency as the input on line 54. The pulses on line 58 drive a re-settable to zero digital recorder 60 which adds one unit per pulse to the least significant digit of the number displayed on the digital recorder. This number displayed represents either the volume or the weight of liquid which has passed down the conduit 2 since use of the apparatus to monitor the flow commenced or the recorder was re-set to zero.

The frequency of the pulses on line 58 is $nb/dMk$. $n\,b$ is a function of the fluid speed and $dMk$ is a function of the internal cross-sectional area of the conduit 2 when the digital read out is recording volume. The cross-sectional area of the conduit can be measured so that the volume of liquid passing therethrough in a predetermined time can be calculated if the speed of flow is known. Therefore when the equipment is being adjusted during its installation and water at known speed S is being passed down the conduit, the setting of the divider 52 can be adjustably varied after the divider 18 has been set. Because the volume of water passing in unit time is known, the divider 52 is adjusted to divide by a value of M to give pulses at frequency which drives the digital recorder 60 to indicate the correct growing volume total as integral of time. This value of M can be read off from the divider and is the only value in $nb/dMk$ which is available for adjustment, since $k$ is a constant and $d$ has a value which is fixed by the nature of the liquid being monitored. When the digital recorder is for measuring the growing volume total, the value of M need not be varied upon the value of $d$ being varied when the apparatus is to be used to monitor another liquid through the same conduit 2. When the digital recorder is to measure the growing weight total of liquid passing through the conduit, dMk is a function of the mathematical product of the cross-sectional area of the conduit and the density of the liquid. Therefore, the growing weight total of water flowing at a known speed S can be calculated with respect to time and the divider 52 adjusted to vary the value of M until the recorder 60 records the growing weight total accurately as an integral of time. Because different liquids have different densities, the value of M has to be varied when the apparatus is used to monitor a liquid having a different density to water. In this case M is varied to a value which is the mathematical product of M, for water, multiplied by the quotient of the density of liquid, it is desired to monitor, divided by the density of water.

Figure 4:
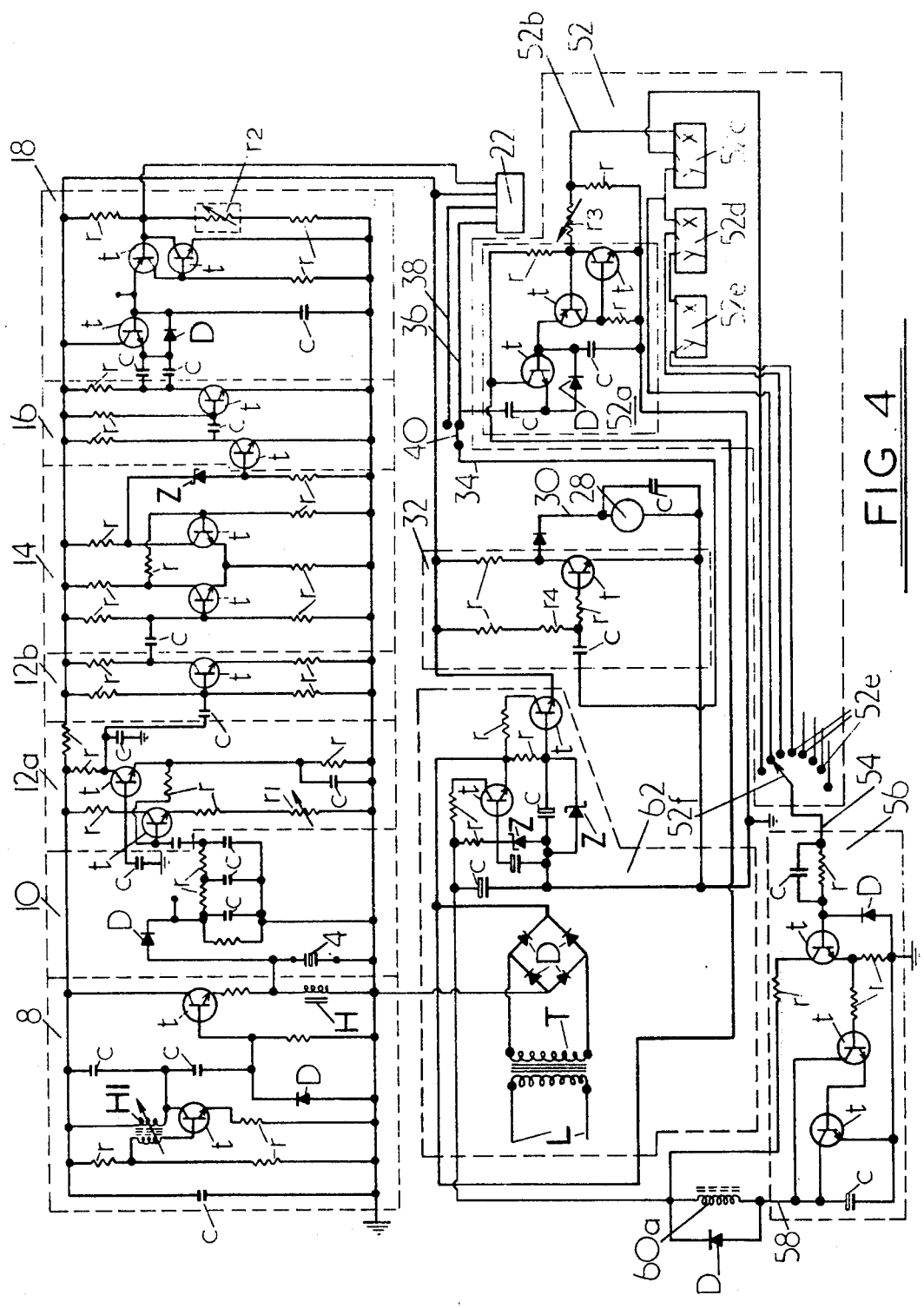
FIG. 4 is a circuit diagram of the apparatus in FIG. 3.

In the electrical circuit shown in FIG. 4, capacitances are shown at $c$, resistances at $r$, variable resistances at $r_1$, $r_2$, $r_3$ and $r_4$, transistors at $t$, diodes at D, Zener diodes at Z, a transformer at T, an inductance at H and a variable inductance at $H_1$. Leads L are connected to the mains electrical supply (not shown) feeding a power pack 62 providing a stepped down D.C. output at a stabilized voltage to the remainder of the apparatus. 60a represents a drive motor of the digital recorder 60 (FIG. 3). The divider 18 is a staircase generator in which the value of the divisor $d$ is controlled by the setting of the variable resistance $r_2$. Divider 22 is an integrated circuit of the known type reference No. 7490 having divide by 2 and divide by 10 stages from which lines 36 and 38 respectively lead. The divider comprises a staircase generator 52a which gives an output on line 52b to a subchain of dividers 52c, 52d and 52e. Dividers 52d and 52e are integrated circuits of known type reference No. 7492 and the divider 52c of the type reference No. 7490. Each of these dividers has an input terminal $x$ and a plurality of output terminals $y$ (only some of which are shown). The output terminals $y$ lead from different known divide stages in each integrated circuit, each divide stage corresponding to a division of the input frequency by a different divisor of known value predetermined by the construction of the integrated circuit. By connecting any output terminal $y$ of any of these integrated circuits to the input $x$ of another, and by connecting any of the outputs y to respective input terminals 52f of a variable selector switch 52g, the input frequency on line 52b can be divided by any one of a number of divisors of different known values according to which terminal 52e the switch 52f is set. Furthermore, the divisor provided by the staircase generator 52a is variable from one known value to another in response to adjustment of the variable resistance $r_3$. Therefore, the numerical value of the divisor M can be changed from one desired value to another by combined variation of the settings of the variable resistance $r_3$ and the selector switch 52f.

The duration of each output pulse from the pulse generator 32 referred to above is variable by means of the variable resistance $r_4$.

If desired the indicator 28 can be used to indicate speed in terms of flow rate, for example volume/unit time or weight/unit time. A dial on the indicator 28 can be marked with pairs of scales of graduations, each pair corresponding to variation of a different parameter with respect to unit time, for example, length/unit time, volume/unit time or weight/unit time. In one predetermined setting of the variable resistance $r_4$, the mean current $i$ on line 30 is the analogue of the variation of one of the parameters with respect to unit time and the indication 28 shows the variation accurately on one or the other, (according to the setting of the switch 40) of a pair of scales relevant to that parameter. When it is desired to know the correct variation with respect to unit time of another of the parameters, the variable resistance $r_4$ is moved to another predetermined setting to produce a mean current $i$ which is the analogue of the variation of this other parameter with respect to unit time which is now read from one or the other of another pair of scales relevant to this other parameter.

When the variable resistance $r_4$ is set for the indicator 28 to indicate flow rate in terms of variation in weight of one liquid with respect to unit time and another liquid of a different density is passed down the conduit 2, the variable resistance $r_4$ is moved to another predetermined setting which corresponds to the new liquid, so that the mean current $i$ on line 30 is now the correct analogue of the flow rate of the new liquid.

The method and apparatus as described above does not require the insertion of the emitter and receiver device 4 inside the conduit and therefore measurement of the speed of the liquid can be carried out by the apparatus without disturbing the flow.

What is claimed is:

1. In an apparatus for monitoring the speed of flow of a liquid along a conduit provided with emitter and receiver means capable, in response to an applied driving signal, of emitting a continuous acoustic signal of predetermined frequency into the liquid and capable of receiving at least a portion of the reflected signal which due to the Doppler effect has a different frequency than the emitted signal; said apparatus being connectable to said emitter and receiver means, the improvement comprising, oscillatory signal generating means for producing the driving signal at said predetermined frequency, filter means for demodulating the emitted frequency from the received frequency to give a first electrical output signal at a frequency equal to the Doppler difference frequency, first variable frequency divider means for dividing the Doppler difference frequency by a first selectively variable predetermined divisor to give an electrical signal at a first quotient output frequency which is a predetermined function of the Doppler difference frequency per unit increment of liquid speed relative to the emitter and receiver means, second variable frequency divider means to further divide said first quotient frequency by a second selectively variable predetermined divisor to give an electrical signal at a second quotient output frequency correlated to the speed of the liquid, and means for utilizing said signal at the second quotient frequency to indicate variation of a parameter with respect to time which derives from movement of the liquid along the conduit.

2. An apparatus as claimed in claim 1 further including a pulse generator, said pulse generator receiving an input at said second quotient frequency and arranged to give an electrical output pulse signal at the same frequency as the input to the pulse generator, said pulse generator being arranged for providing said output pulse signal as an analogue of a function of the speed of the liquid, and said means responsive to said signal at the second quotient frequency arranged to give an indication of the speed as a direct representation of the speed of liquid flow or as a representation of a flow rate of the liquid.

3. An apparatus as claimed in claim 2 in which the indicator means is arranged to separately indicate a low range of speeds and/or flow rates and a greater range of speeds and/or flow rates, and means provided for connecting any of a plurality of second quotient frequency outputs from said second frequency divider means to the pulse generator, and the second divider means being arranged such that each second quotient frequency output is derived by dividing the first quotient frequency by a respective constant second divisor respectively correlated to a respective said speed range or flow rate range.

4. Apparatus as claimed in claim 3 in which the second divider means is an integrated circuit in which the numerical value of each second divisor is constant.

5. Apparatus as claimed in claim 2 in which the pulse generator is adjustable for varying a mean current of the pulse output.

6. An apparatus as claimed in claim 1, in which the second divider means is arranged to supply the electrical signal at the second quotient frequency as an input signal to third variable frequency divider means arranged to divide the second quotient frequency by a selectively variable predetermined third divisor to give an electrical output signal at a third quotient frequency which is correlated to a flow rate of the liquid, a pulse generator arranged to receive the signal at said third quotient frequency and generate an output signal of electrical pulses at said third quotient frequency, and counter means for counting and recording said pulses to provide a time integral of the flow rate.

7. Apparatus as claimed in claim 6 in which the third frequency divider comprises a staircase generator which is adjustable for varying the numerical value of the divisor by which the frequency of an input signal to this staircase generator is divided to give an output signal at a quotient frequency.

8. Apparatus as claimed in claim 7 in which the third divider means include a plurality of interconnected integrated divider circuits arranged to receive, as an input signal, the quotient frequency output signal from the staircase generator of said third divider means, and output signal lines, from different stages of division of this input signal by predetermined constant divisors in the interconnected integrated divider circuits, being connected to respective input terminals of a selector device, whereby the numerical value of the divisor by which the frequency of the input to the interconnected integrated circuits is divided, can be selectively chosen.

9. Apparatus as claimed in claim 1 in which the first divider means is a staircase generator with means for adjusting the numerical value of the first divisor.

10. Apparatus as claimed in claim 1 wherein said emitter and receiver means are mounted externally of the conduit.

11. Apparatus as claimed in claim 10 in which the emitter and receiver means is bonded to the conduit.

* * * * *